United States Patent
Buono et al.

(10) Patent No.: US 10,021,435 B2
(45) Date of Patent: Jul. 10, 2018

(54) METHOD AND SYSTEM FOR DATACASTING AND CONTENT MANAGEMENT

(71) Applicant: SpectraRep, LLC, Chantilly, VA (US)

(72) Inventors: Thomas J. Buono, Spotsylvania, VA (US); Mark O'Brien, Great Falls, VA (US); Rodney G. Herrmann, Agra, OK (US)

(73) Assignee: SpectraRep, LLC, Chantilly, VA (US)

( * ) Notice: Subject to any disclaimer, the term of this patent is extended or adjusted under 35 U.S.C. 154(b) by 0 days.

(21) Appl. No.: 15/596,385

(22) Filed: May 16, 2017

(65) Prior Publication Data
US 2017/0339436 A1   Nov. 23, 2017

Related U.S. Application Data

(60) Provisional application No. 62/337,527, filed on May 17, 2016.

(51) Int. Cl.
*H04N 21/435* (2011.01)
*H04N 21/258* (2011.01)
(Continued)

(52) U.S. Cl.
CPC ..... *H04N 21/2347* (2013.01); *H04L 63/0428* (2013.01); *H04L 63/10* (2013.01);
(Continued)

(58) Field of Classification Search
CPC ........... H04N 21/2347; H04N 21/2351; H04N 21/25816; H04N 21/4353; H04N 21/4405; H04N 7/181; H04N 7/14; H04N 7/142; H04N 7/147; H04L 63/10; H04L 63/0428; H04L 2209/80; H04L 2209/08;
(Continued)

(56) References Cited

U.S. PATENT DOCUMENTS

2008/0034114 A1* 2/2008 Ducey .................... H04H 20/24
709/238

FOREIGN PATENT DOCUMENTS

WO    WO 9723096 A1 * 6/1997 ....... G08B 13/19645
WO    WO 2015076905 A2 * 5/2015 ............. H04N 7/181

* cited by examiner

*Primary Examiner* — Benjamin R Bruckart
*Assistant Examiner* — Tien M Nguyen
(74) *Attorney, Agent, or Firm* — Maier & Maier, PLLC

(57) ABSTRACT

A method and system of content management for datacasting. Such a system may have, as its core, a dashboard system for managing data feeds. A dashboard system may receive data feeds from one or more associated devices, such as the hardware devices of first responders or other public safety officers, and may aggregate and prioritize them. The dashboard system may then manage, prioritize and encrypt the video, files and other data in preparation for broadcast over the television or satellite transmitter, via, for example, a television broadcasting station, and may then broadcast the video, files, or other data to a plurality of users. Alerts and notifications may be created, files attached and links to video streams distributed over this same broadcast network. The broadcasting system may be able to send multiple streams of content simultaneously, may be able to target specific users to be broadcast to, and may be able to incorporate data from public data sources, such as public security cameras.

21 Claims, 7 Drawing Sheets

(51) Int. Cl.
  *H04N 21/2347*   (2011.01)
  *H04L 29/06*     (2006.01)
  *H04N 21/235*    (2011.01)
  *H04N 21/4405*   (2011.01)

(52) U.S. Cl.
  CPC ... *H04N 21/2351* (2013.01); *H04N 21/25816* (2013.01); *H04N 21/4353* (2013.01); *H04N 21/4405* (2013.01); *H04L 2209/80* (2013.01)

(58) Field of Classification Search
  CPC ........ G08B 13/19645; G08B 13/19682; G08B 13/19689; H04H 20/59
  See application file for complete search history.

METHOD AND SYSTEM FOR DATACASTING AND CONTENT MANAGEMENT

CROSS REFERENCE TO RELATED APPLICATIONS

This application claims priority from U.S. Provisional Patent Application Ser. No. 62/337,527, filed May 17, 2016, the entire contents of which are hereby incorporated by reference.

BACKGROUND

When first responders are called to an emergency, they typically benefit from having accurate and up-to-date information about the nature of the emergency and the location where it occurred. This often includes information like building blueprints, handling instructions for any on-site hazardous material, or other time-sensitive data. This information can also include documents or other references that must be delivered in picture or video form, such as the aforementioned blueprints.

Some existing solutions for providing information to first responders has made use of television broadcast channels. For example, software is available that enables the distribution of encrypted video or picture files, or other large files, over a local broadcast television station to targeted computer devices, using a process called "datacasting." Providing information via broadcast television channels has certain advantages; for instance, since broadcast television infrastructure, such as high power transmitters and low power gap filler repeaters, effectively covers almost all areas of the United States, repurposing a portion of this for public safety use allows emergency responders to make use of existing infrastructure. Datacasting's ability to encrypt content and target specific receivers also allows users to create segregated paths so that multiple users cannot see what others are doing. Those pathways can also be broken when desired to share information across agencies, improving interoperability. Since datacasting natively uses a one-to-many broadcast content delivery method, it also does not suffer from bandwidth congestion, as many unicast/one-to-one broadcasting methods (such as 3G and 4G wireless telecommunications networks) do.

However, existing datacast technology has suffered from certain drawbacks. One major drawback is the fact that television broadcasting typically utilizes communications that are one-way, not two-way, and as such the system typically only allows for one-way and not two-way distribution of content. Emergency personnel can receive information, but have little ability to send or share any of their own via the same channels, which makes information sharing between on-site emergency personnel more difficult. There are also difficulties with aggregating data between multiple sources; for example, there can be difficulties in aggregating data from multiple different agencies, each of which uses a different source or series of sources, without taking the time to duplicate all of the data possessed by each agency for the source material or content of each agency.

SUMMARY

According to at least one exemplary embodiment, a method and a system of data management for datacasting may be described. Such a method and system may be able to send multiple streams of content simultaneously, may be able to target specific users to be datacast to, and may be able to incorporate data from public data sources, such as public security cameras.

Such a method of data management for datacasting may include: receiving data, by an encoder, from at least one of a plurality of sources; encoding the data, by the encoder, to be a format that is eligible to be managed by a dashboard; storing the data by a memory; managing the data, by the dashboard, for datacasting; authorizing, by the dashboard, at least one of a plurality of receivers to receive the data; and communicating, by at least one of the plurality of receivers, with the dashboard. According to an exemplary embodiment, the dashboard may perform an encryption of the data and/or managing the encryption of the data for a targeted receiver so that the targeted receiver may decrypt the data after receiving the data, prioritizing at least one of the data for the datacasting, selecting at least one of the data for the datacasting, combining the data, adding an additional information to the data and/or converting the data into a datacasting content, for the datacasting.

According to an exemplary embodiment, a first mobile application is implemented on the sources to send the data to the dashboard, and a second mobile application is implemented on the receivers to receive the data. Also, in an exemplary embodiment, the source, after receiving the data as the receiver, may resend the data to the dashboard after adding a feedback into the data by controlling the dashboard. Further, the encoder may be operated as an online cloud system, the memory may be an online cloud storage, and the dashboard may be portable dashboards, online dashboards, offline dashboards and/or video management systems (VMSs) and the portable dashboards, the online dashboards, the offline dashboards and the VMSs may communicate with each other. Also, in an exemplary embodiment, the dashboard may generate the data as the source for the datacasting.

According to an exemplary embodiment, the data may include a video, an audio, a text, an image, Metadata, a live data stream, a file, an alert, a notification and/or an emergency alarm, the sources may include a video management system (VMS), a public safety officer, a security camera, an aircraft, an airship, an unmanned aircraft system (UAS), a stationary device and/or a portable device, and the receiver may include a stationary antenna, a portable antenna and/or a wired receiver.

In another exemplary embodiment, a system of data management for datacasting may be described. Such a system may include: a plurality of sources that generates a data; an encoder that receives and encodes the data to be a format that is eligible to be managed by a dashboard; a memory that stores the data; a dashboard that manages and sends the data; and a plurality of receivers that receives the data. According to an exemplary embodiment, the sources or the receivers may communicate with the dashboard by at least one of an implemented software and an equipment. Also, in an exemplary embodiment, the dashboard may authorize at least one of a plurality of receivers to receive the data, perform an encryption of the data and/or managing the encryption of the data for a targeted receiver so that the targeted receiver may decrypt the data after receiving the data, prioritize at least one of the data for datacasting and select at least one of the data for the datacasting.

According to an exemplary embodiment, the source may receive the data as the receiver, and the source may share a specific content with other sources by sending the specific content to the dashboard. Also, in an exemplary embodiment, the dashboard may be controlled by an authorized operator, the source, and/or a user who has a specific login credential. Further, the dashboard may control the sources and/or the receivers. Also, in an exemplary embodiment, a specific source may control the dashboard for a specific data which is generated by the specific source.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which:

Exemplary FIG. 1 may show a process flow diagram of an exemplary embodiment of a method for datacasting and content management;

Figure 2:
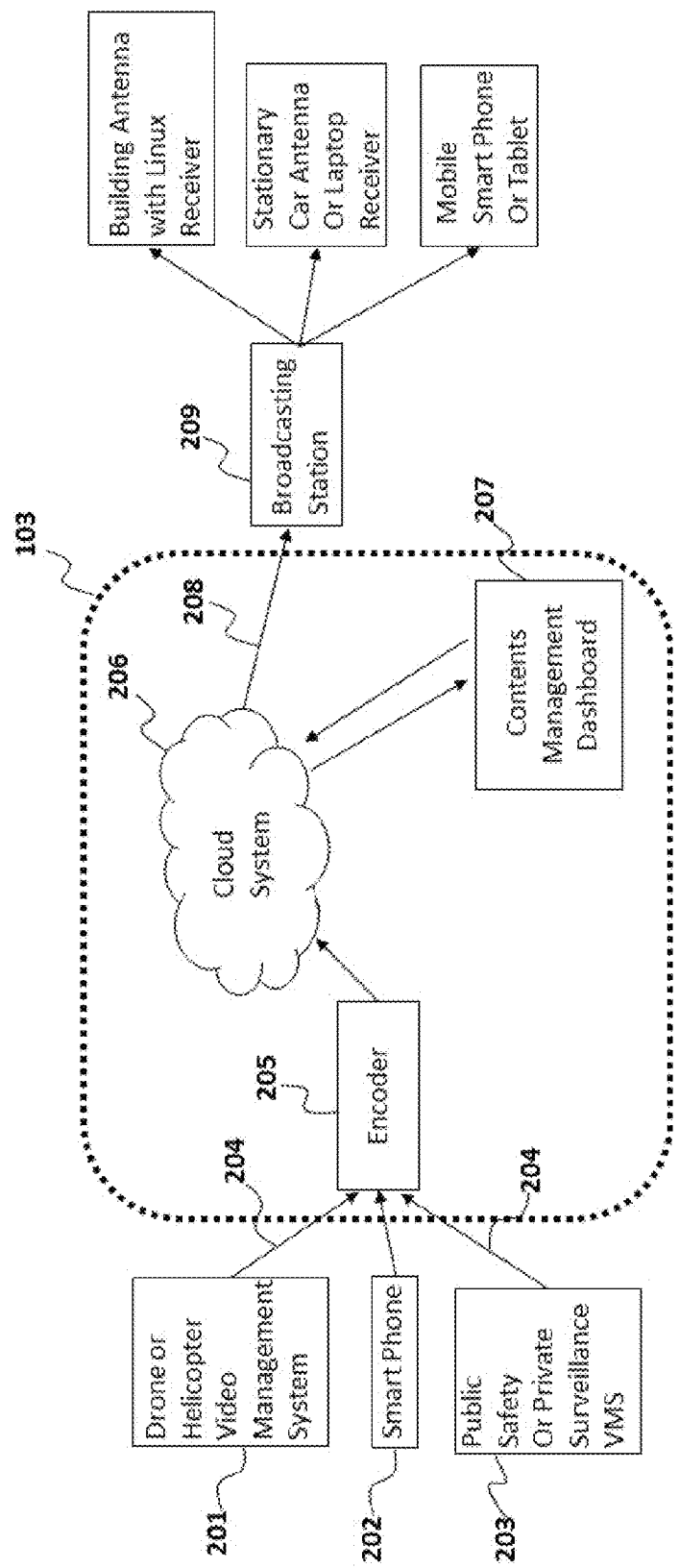
Figure 3:
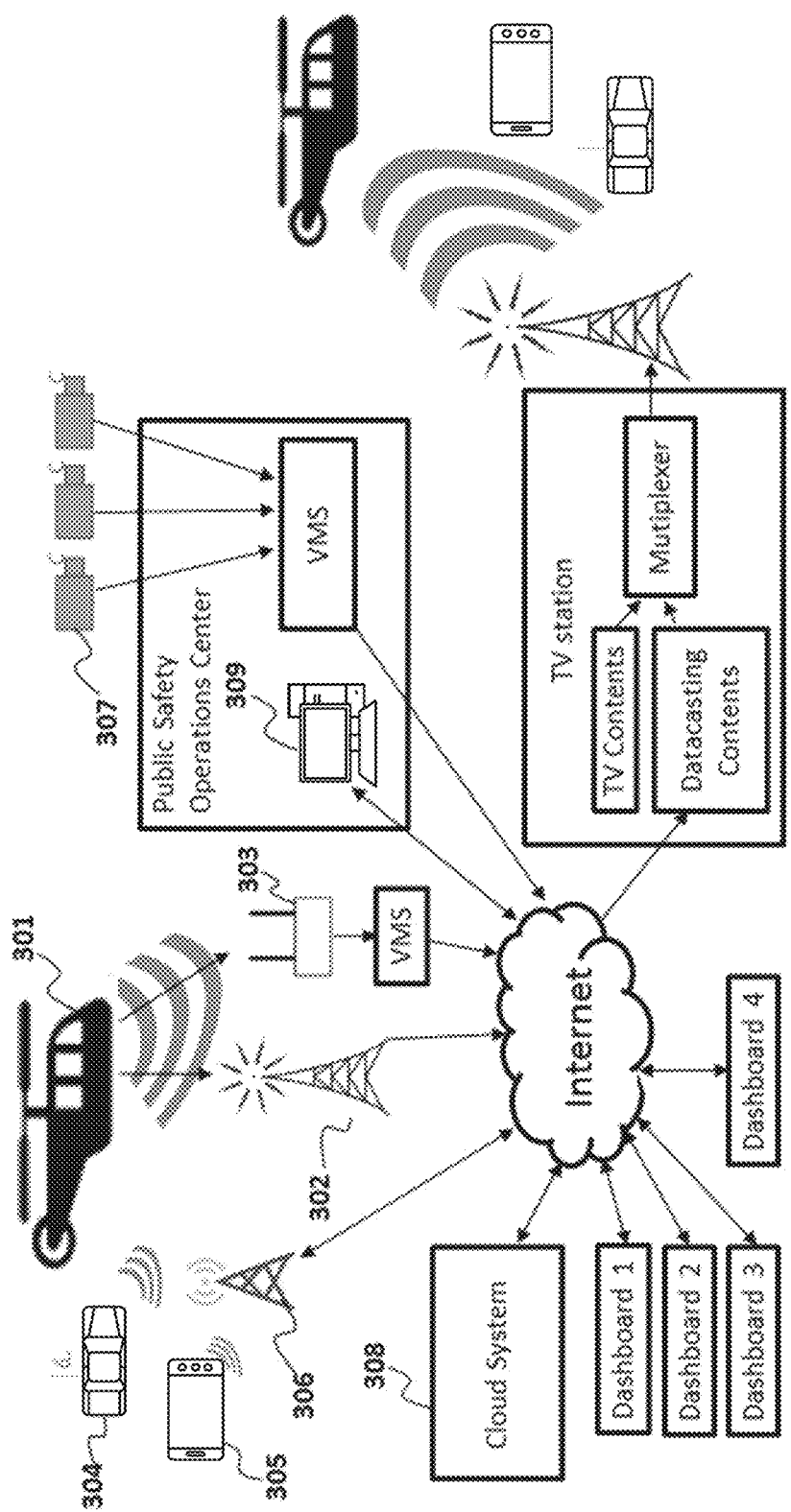
Figure 4:
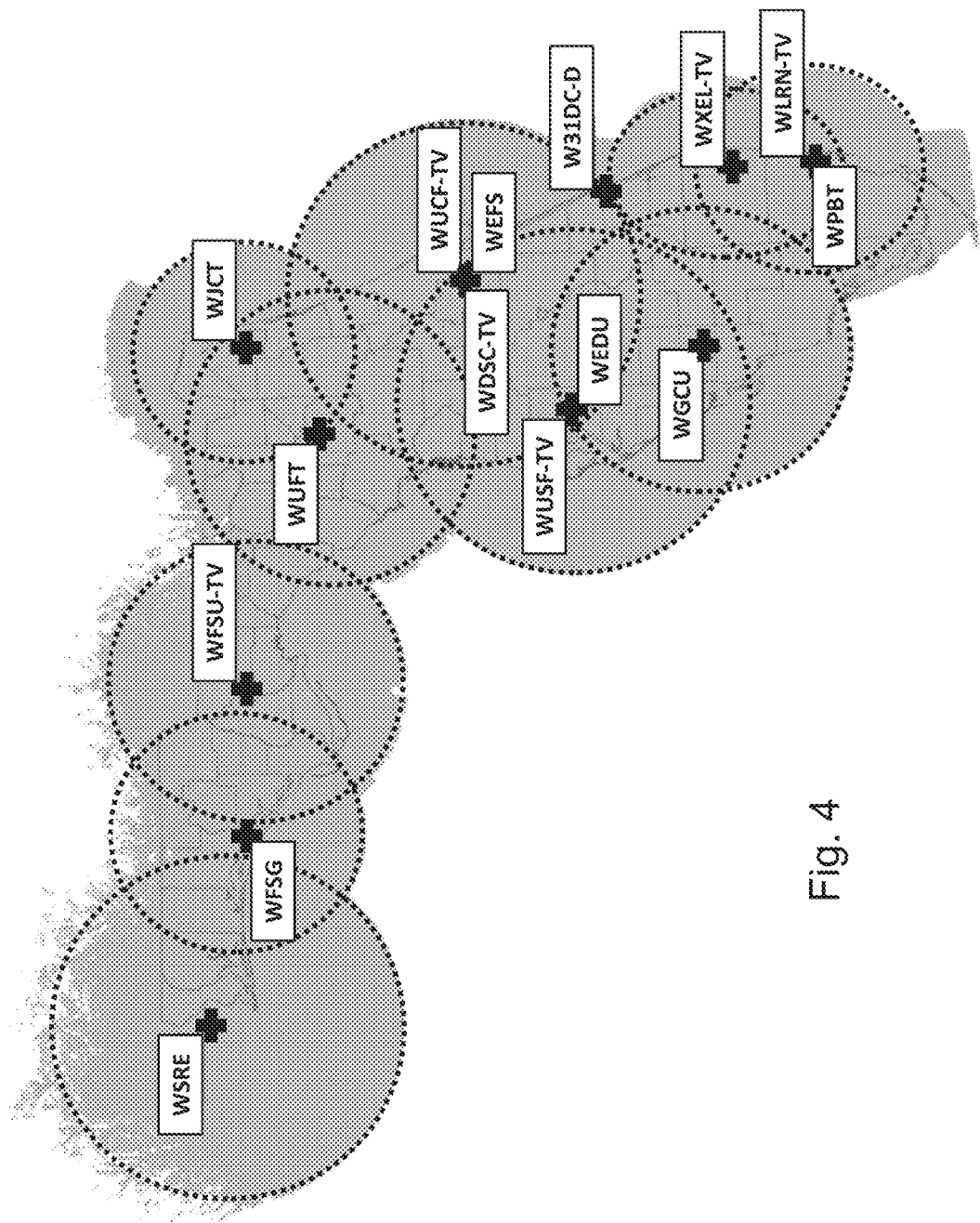
Figure 5:
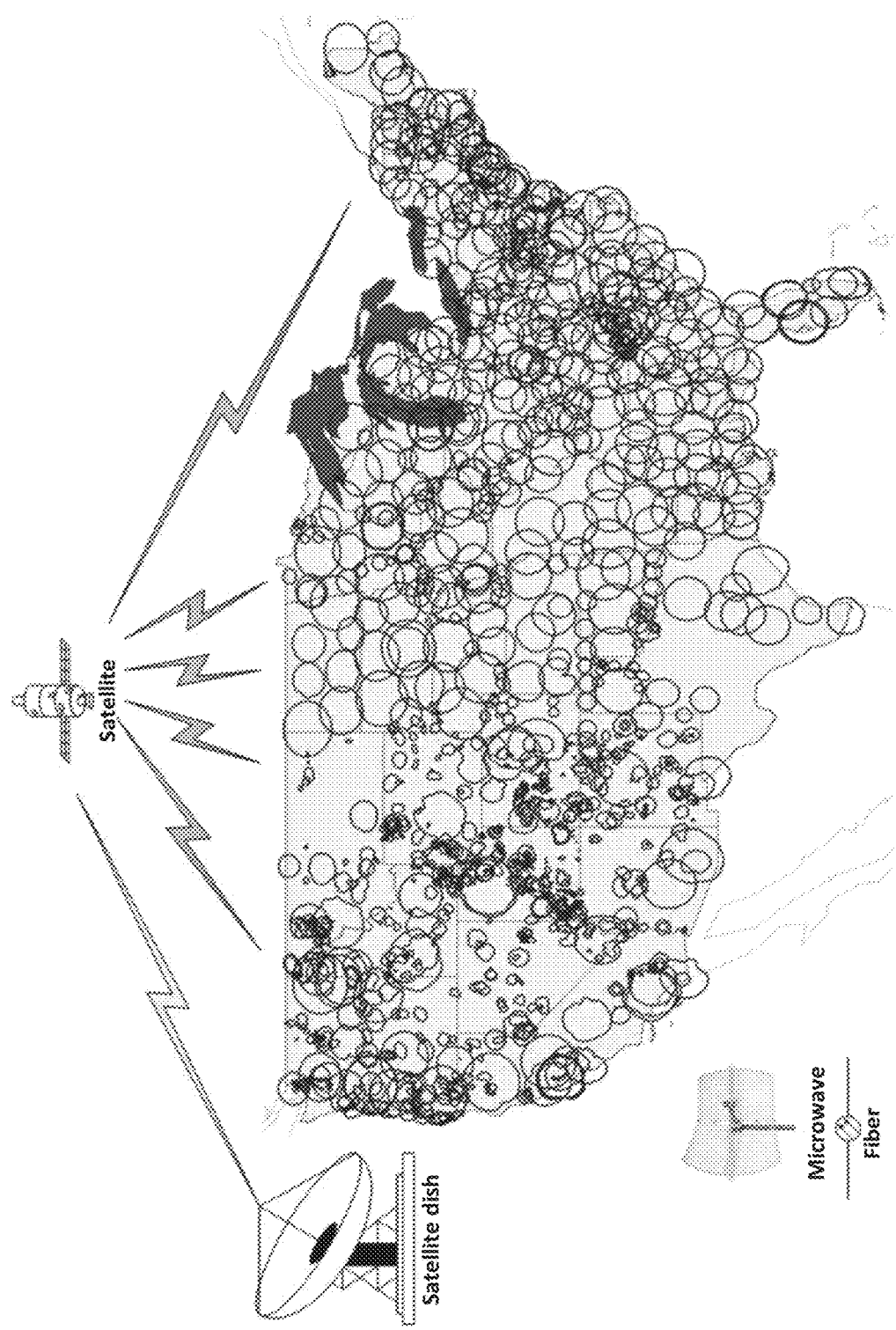
Figure 6:
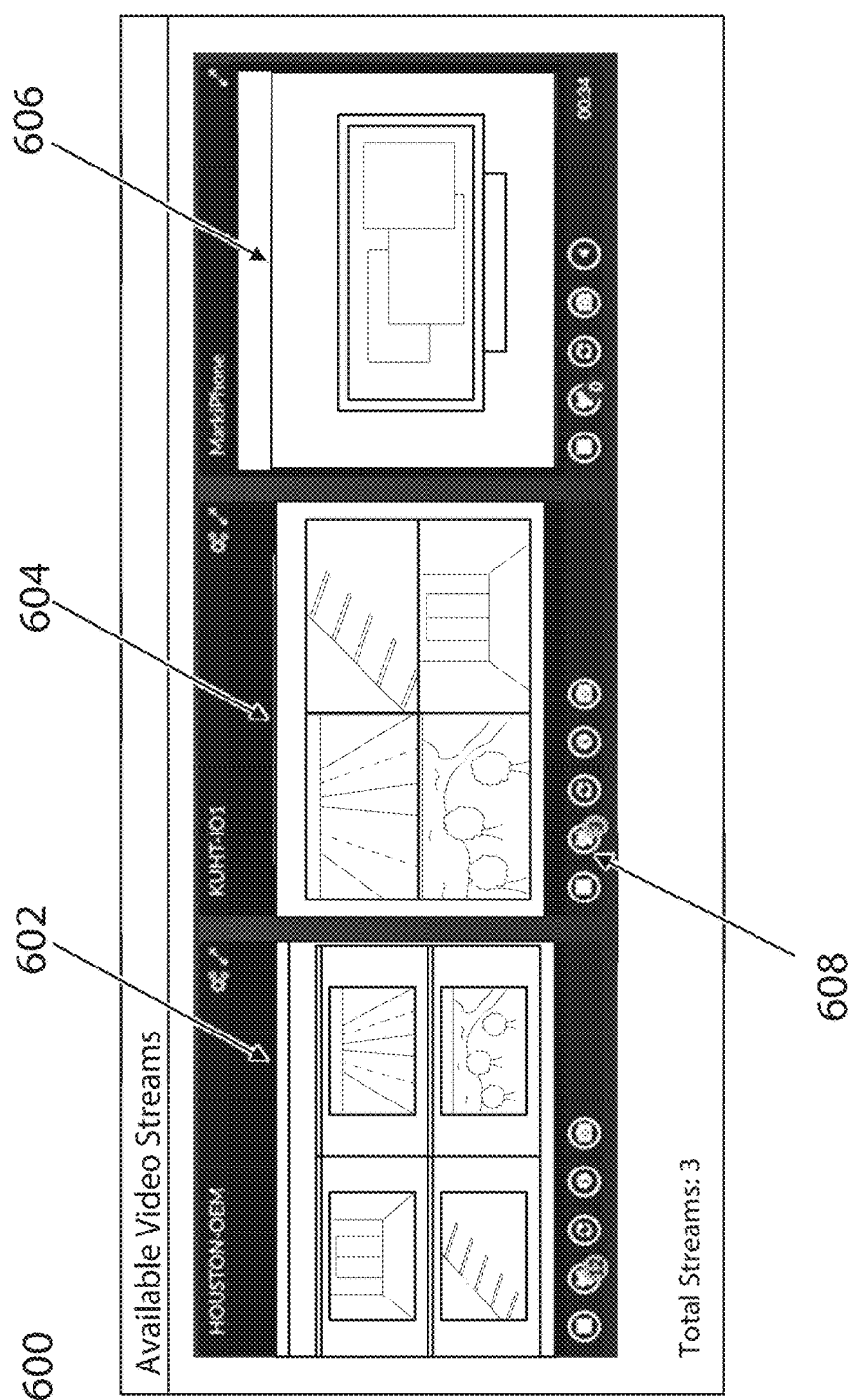
Figure 7:
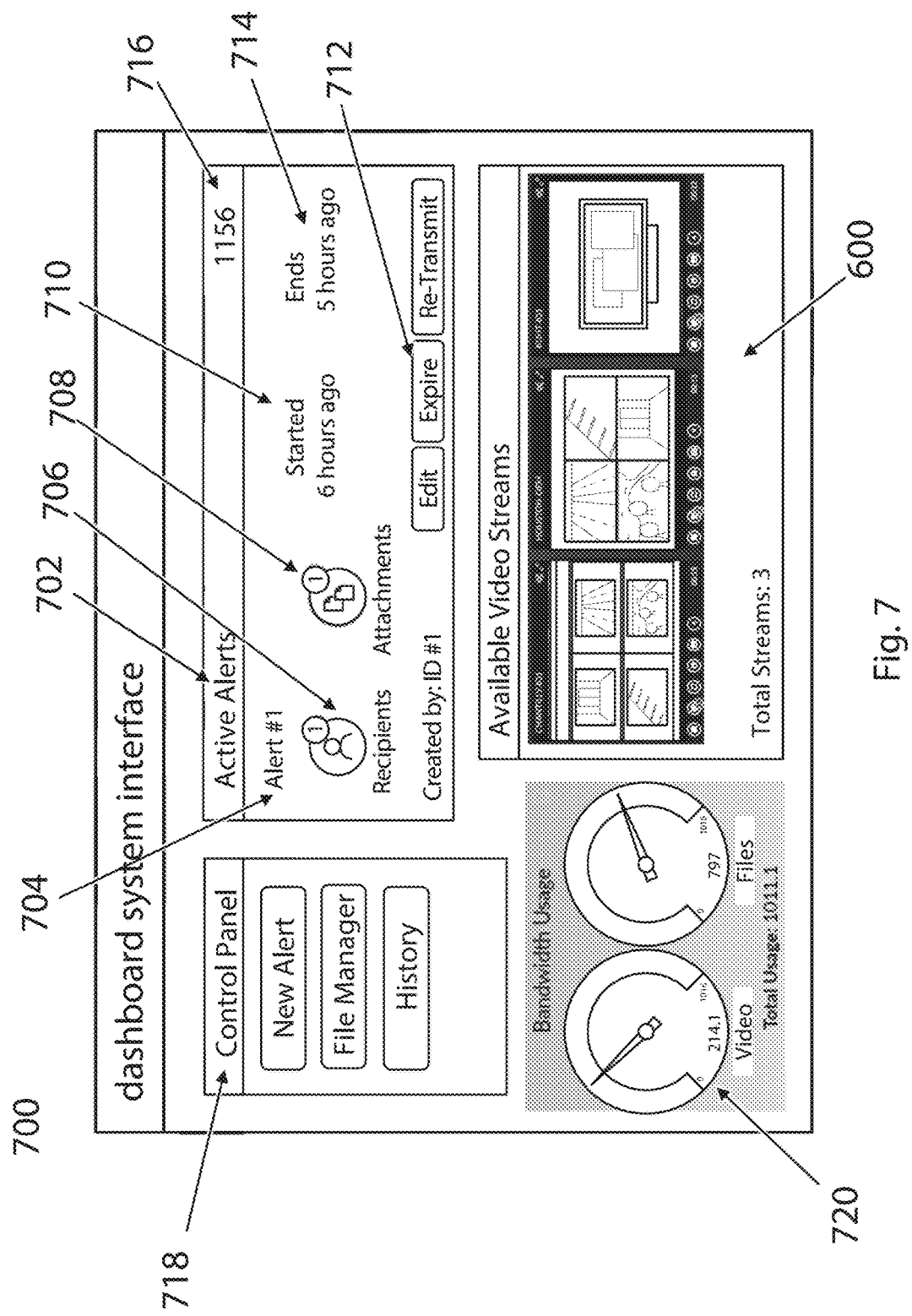

Exemplary FIG. 2 may show a schematic diagram of an exemplary embodiment of a system for datacasting and content management;

Exemplary FIG. 3 may show an exemplary schematic diagram of an exemplary embodiment of a system for datacasting of contents from aircrafts;

Exemplary FIG. 4 may show an exemplary coverage map of a system for datacasting and content management;

Exemplary FIG. 5 may show an exemplary coverage map of a system for datacasting and content management;

Exemplary FIG. 6 may show an exemplary embodiment of the video display of a dashboard system; and Exemplary FIG. 7 may show an exemplary embodiment of the interface of a dashboard system.

DETAILED DESCRIPTION OF THE EMBODIMENTS

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

According to an exemplary embodiment, and referring to the Figures generally, a method and system for datacasting and content management may be disclosed. According to an exemplary embodiment, such a method may be embodied in one system or in a network of systems, for example a network of broadcasting sources, as desired. Such a method may also include one-way communication, two-way communication, or a combination of the two, as desired.

According to an exemplary embodiment, a system for datacasting and content management may use as its core one or more dashboards configured to provide content management and presentation, to be operated by one or more operators. Dashboard may be a single device or a network of devices, as desired. In an exemplary embodiment, the dashboard may be configured to receive data inputs, such as video data inputs, from a plurality of sources, for example a plurality of first responders. The dashboard may then be configured to, or may be configured to allow the operator to, consolidate, manage, and/or prioritize these data inputs. For example, in one exemplary embodiment, multiple video data inputs may be received and may then be selected for broadcast to specific remote users. Metadata, files, notifications and other associated content may be added; this may include, for example, combining the video feeds received from multiple security cameras at a location, so that a composite video feed encompassing multiple camera views can then be provided. In another exemplary embodiment, other data inputs may be combined with a video data input or with each other. For example, in an exemplary embodiment, a dashboard may combine an image of a blueprint of a site location with an audio data input of a site engineer explaining the features of the blueprint, and this combination may be transmitted as a new composite video stream encompassing all data elements. Also, in another exemplary embodiment, the blueprint may be transmitted as a file for manipulation and use directly in the field. The dashboard may be configured to receive multiple forms of data input, for example video data, audio data, picture or image data, text, or any other form of data input, as desired.

The dashboard may receive data from a variety of sources as well as in a variety of forms. For example, according to an exemplary embodiment, a mobile app for a smartphone, tablet, or other portable device may collect data from the portable device, such as a live video stream, or metadata, such as location information. According to an exemplary embodiment, the portable device, such as a smartphone or tablet having a video camera, may be configured to provide a video stream using its own hardware. The mobile app may then upload this data to the dashboard using a consumer or public safety one-to-one network, such as an LTE network, WiFi or the Internet. According to another exemplary embodiment, the portable device may be connected to another system, such as the video management system (VMS) of a private enterprise, and may provide data available to the other system or may make use of hardware associated with the other system. According to an exemplary embodiment, this app may be restricted-access, such that only, for example, first responders or specific first responders with appropriate credentials may be able to download it and transmit data to the dashboard. According to another exemplary embodiment, members of the public may be able to transmit data using the app or may otherwise be able to transmit data to the dashboard, for example to supplement the data-collecting of first responders or to supplement requests for aid in an emergency. According to another exemplary embodiment, the dashboard may be able to accept data from sources other than the app. For example, the dashboard may accept video data, audio data, picture data, or other data that is sent to it directly, or which is uploaded to a specified location. This may include, for example, an image file sent to a phone number associated with the dashboard via an MMS message, may include a video uploaded to an online hosting service, may include data found at an internet hyperlink provided to the dashboard via a social media service, may include audio from a public safety radio system or phone call, or may include any other type of data and messaging method, as desired. Other potential data inputs may include, for example, files, messaging, alerts, notifications and other non-video content, or other data inputs, as desired.

Other hardware available to first responders or related personnel may also be integrated with or may send data to the dashboard system. For example, according to an exemplary embodiment, the dashboard may receive video from a police dashboard camera, a camera worn on the body of a first responder, a helicopter camera, the camera of a drone/unmanned aircraft system (UAS), a video management system (VMS), or even another dashboard. This may improve integration and information interoperability between first responders or the officers affiliated with multiple public safety agencies.

For example, the use of the dashboard may make it easier for the officers of a public safety agency that operates a helicopter to maintain their awareness of where the helicopter is and what it is doing, and may make it easier for the officers in the helicopter to keep track of what other officers on the ground are doing, in both cases by improving communication to and from the helicopter. The portable device application may also be used to enhance or replace the camera on the helicopter. Existing helicopter transmission uses microwave transmitters in the helicopter to transmit to the ground. However, such existing transmitter methods are line-of-sight, are difficult to receive and have limited range. However, if integrated with the dashboard system, the helicopter may be able to use public or private LTE towers, or towers already in place at broadcast television stations outfitted with helicopter receive antennas, fiber backhaul and other TV infrastructure, as well as antenna pattern changes on the helicopter to improve the range and accessibility of this video. Even other aircraft, such as aircraft not operated by a public safety agency, such as broadcast TV news helicopters, can receive video from the helicopter, if desired. This video can then be datacast by the dashboard system over a large geographic region. In an exemplary embodiment, a public safety agency may operate another aircraft or airship other than a helicopter, such as, for example, an unmanned aircraft system, an airship/lighter-than-air aircraft, or a fixed-wing aircraft, which may likewise be integrated with the dashboard.

In another exemplary embodiment, other hardware from public or private sources may be configured to be integrated with or to send data to the dashboard system. For example, according to an exemplary embodiment, the dashboard system may receive data from security cameras, such as security cameras in public buildings, banks, convenience stores, and the like. According to one exemplary embodiment, this may be a constant live feed; for example, in an exemplary embodiment, the security cameras of a city government office may provide a direct and uninterrupted video feed to a dashboard system. According to another exemplary embodiment, the operator of public or private data collection hardware may have the option to divert a data feed to a dashboard system, for example whenever desired or whenever certain conditions are met. For example, according to one exemplary embodiment, a manager or other party at a public building, bank, convenience store, or similar building may be able to declare an emergency, trigger a silent or audible alarm, or perform some other action, which may cause the live video of that building, and/or any other relevant data collected from any other data sources, to be diverted to law enforcement by way of the dashboard system. According to an exemplary embodiment, certain first responders, including for example SWAT units, may have mobile versions of the dashboard or mobile units that may be configured to make ad hoc connections to live video feeds or other on-site data sources, or relevant video or other data may be pushed to them over the broadcast television signal using datacasting allowing them to be updated in substantial real time. In another embodiment, mobile units may also rebroadcast a broadcast television signal, and may incorporate, for example, low-power transmitters or on-channel repeaters; this may be used to provide datacasting to first responders in areas of lower coverage, such as inside buildings.

According to an exemplary embodiment, the owner of a data feed may retain full control over their content, and may be able to change what is published by the cameras to the dashboard, manipulate data collection devices (for example, moving the cameras), or otherwise change the feed to the dashboard from the data collection devices under their control. In such an embodiment, some or all of the users of the dashboard may be able to see what is published to the dashboard; however, users of the dashboard that are not content owners may not be able to change or manipulate the data collection devices that publish the feed to the dashboard. According to another exemplary embodiment, a user of the dashboard may have a limited ability to change or manipulate data collection devices publishing a feed to the dashboard; for example, according to an exemplary embodiment, once a feed from a public or private data collection device (such as the security camera at a convenience store) has been diverted to law enforcement by way of the dashboard system, the dashboard system may also be able to send commands to the public or private data collection device.

Certain data may be sent to the dashboard system with a higher priority. According to some exemplary embodiments, higher-priority data may include, for example, communications by a ranking official such as a police chief, a mayor, a governor, or the President, or may include, for example, emergencies that have been signaled by public or private sources. According to an exemplary embodiment, data inputs to the dashboard may be assigned a higher priority when designated for transmission as a datacast; for example, hardware available to first responders may be configured to change the priority status of their information based on certain inputs or keywords, such as an instruction from the first responder or the press of a button. According to another exemplary embodiment, data inputs to the dashboard may be assigned a higher priority when received; for example, the dashboard may assign a higher priority to any video recordings containing sounds that it determines to be gunfire. According to an exemplary embodiment, higher-priority data may be displayed by the dashboard more prominently, or may be easier to retrieve, as desired.

According to another exemplary embodiment, the dashboard may also be configured to retrieve specific data upon request, edit or produce data, or otherwise interact with data, as desired. For example, according to one exemplary embodiment, a first responder that responds to an emergency may come across a victim or other person at the scene of the emergency who does not speak a common language with the first responder. According to an exemplary embodiment, audio or video data of such a person speaking a foreign language, or otherwise attempting to communicate with the first responder such as via the use of sign language, may be transmitted to the dashboard by the first responder. The dashboard may then be configured to solicit a translation from another source, such as a human translator or machine translation service, or may be configured to perform a translation itself.

The dashboard may be configured to broadcast data that is accessible to it to one or more parties, for example one or more first responders at or near a location or working jointly on a response from different locations. Broadcast data may include, for example, data that has been recorded, or data that has been recorded and edited. This may also include live data streams; for example, the video data recorded by and received from one first responder may be automatically rebroadcast to some or all of the first responders in the area as targeted by the sender. In an exemplary embodiment, the dashboard may augment and rebroadcast a data feed; for example, according to one exemplary embodiment, video data received by a first responder may be received by a dashboard, which may perform some action (such as facial recognition) to augment the video data, and which may then rebroadcast the video data to the first responder.

According to an exemplary embodiment, the dashboard may broadcast data to one or more first responders by using datacasting, which may be done over, for example, a portion of the electromagnetic spectrum available to television broadcast signals. According to an exemplary embodiment, the dashboard may make use of multiple portions of the electromagnetic spectrum; for example, portions of the electromagnetic spectrum may be dynamically allocated in order to maximize the quality of the content sent, or the speed with which it can be sent with an acceptable quality or latency. For example, according to one exemplary embodiment, a system may be configured to generate and send multiple concurrent data streams simultaneously within a limited set of channel capacity provided by a television station, for example 1 Mpbs, and the amount of channel capacity allocated to any one particular stream may be dynamically adjusted. In an exemplary embodiment, each of a set of multiple concurrent data streams may target one of a unique and unlimited set of remote users, and users may be targeted to receive multiple concurrent streams if desired. According to an exemplary embodiment, dynamic allocation of data streams may incorporate statistical multiplexing, which may allow each stream to share allocated bandwidth dynamically, such that each receives the appropriate amount of bandwidth for the video complexity at that moment, and such that the bandwidth allocated to each stream may be automatically adjusted as the video complexity of each stream in the multiple concurrent data streams that is competing for bandwidth changes in real time. Adjustments may be made based on, for example, the type of content and other requirements of the system. According to an exemplary embodiment, terrestrial broadcasting or satellite broadcasting, or a combination of the two, may be used.

According to an exemplary embodiment, any of a variety of one-to-many broadcasting formats, including ATSC 1.0, ATSC 3.0, DVB, or another modulation format, may be used by the dashboard system to broadcast data. According to another exemplary embodiment, video may be re-encoded and normalized using any video encoding format including HEVC, H.264, H.265, or any other format, to compress the video so as to reduce bandwidth requirements and improve spectral efficiency. Also, in an exemplary embodiment, statistical multiplexing, or some method of sharing a fixed bandwidth allocation among multiple sources, rather than allocating fixed bandwidth to each source may be used to improve video quality by dynamically adjusting the bandwidth allocated to each video source. According to an exemplary embodiment, the dashboard system may also have access to, and may be able to transmit using, a one-to-one communication method, for example if data is intended to be transmitted to a smaller number of recipients. In an exemplary embodiment, the dashboard system may use an algorithm to select an optimal distribution path from a plurality of potential distribution paths whenever data is to be broadcast.

According to an exemplary embodiment, the dashboard system may be integrated with other dashboard systems. For example, according to one exemplary embodiment, the dashboard system may be part of a much larger datacasting network connected by, for example, satellite, microwave or fiber; such a larger datacasting network may be, for example, a regional or nationwide datacasting network aimed at protecting public safety. An exemplary dashboard system belonging to one agency, or a "neutral" dashboard system belonging to no agency or no one specific agency, may integrate data belonging to other agencies or provided by other dashboard systems, which may allow networks connected to the dashboard systems to be bridged and content to be aggregated, viewed, and managed at multiple locations. One exemplary embodiment of such a dashboard system may be a VMS of VMSs; that is, a consolidated view of multiple video management systems aggregating video and data from multiple systems for the purpose of conserving screen real estate, or providing a summary view of the most relevant information from each source as determined by the individual sending entities pushing data to the dashboard. According to an exemplary embodiment, a communication from one dashboard system to another dashboard system may overcome security measures, such as network firewalls, that would otherwise prevent the networks from being connected to one another in other ways. According to some exemplary embodiments, other dashboard systems and broadcasting stations may use identical portions of the electromagnetic spectrum, similar portions of the electromagnetic spectrum, or different portions of the electromagnetic spectrum when communicating with other dashboard systems and broadcasting stations, as desired.

According to an exemplary embodiment, the functionality of the dashboard that is available to any one particular user of the dashboard system may be controlled based on the identity of the user, for example based on the user's login credentials, or based on the user's identified rank in their agency. For example, according to an exemplary embodiment, a user having a first level of login credentials, or a general level of access, may merely be able to view the aggregated content from a dashboard system. According to another exemplary embodiment, a user having a second level of login credentials may be able to push content in the dashboard system to other recipients. This may include, for example, recipients in the same agency as the user, recipients not in the same agency as the user, private or foreign recipients, or any other recipients, as desired and authorized.

While many of the exemplary embodiments discussed above make reference to first responders, public safety or law enforcement, the capabilities of the dashboard system may also be used for commercial purposes. For example, according to an exemplary embodiment, the security system of a corporation or plurality of corporations, or the security systems of homes, offices, schools or other buildings or fixtures, may be integrated with a dashboard system, for example a dashboard system belonging to a corporate security office or private security firm. Alternatively, the principles behind a dashboard system may be used for content broadcasting where distribution to specifically targeted receivers is desired. For example, an electronic video distribution service may use a dashboard system to distribute popular videos to cached set-top receivers or portable devices such as smartphones or tablets, which may be used to, for example, enable users to operate a proprietary TV channel, or may otherwise be used to distribute video or other large-file content to consumers or other specifically targeted users.

Figure 1:
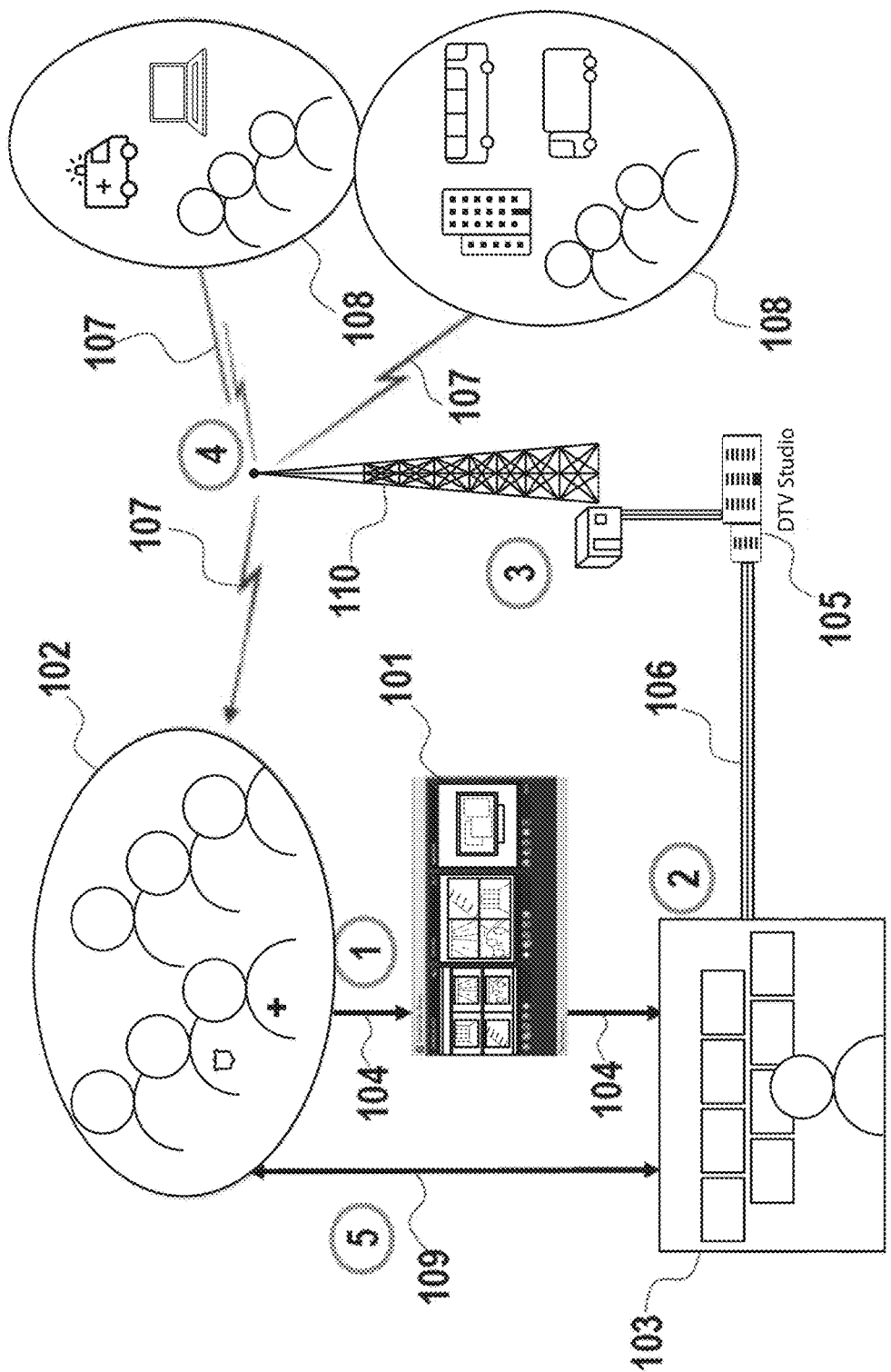

Turning now to exemplary FIG. 1, FIG. 1 may show a process flow diagram for an exemplary embodiment of a method for datacasting and content management. In a first step, data 101, including video or other content, may be generated from one or more sources 102 in the field; for example, it may be produced by a first responder recording a video with a mobile device. This data 101 may be sent to a dashboard system 103. Data 101 may be sent using, for example, a mobile app installed or connected to the mobile device of the first responder, which may make use of a one-to-one connection 104, such as a 4G LTE connection, to send the data 101 to the dashboard system 103.

In a second step, the dashboard system 103 may aggregate the data 101 it has received from one or more sources 102, such as one or more first responders. The dashboard system 103 may then take steps to sort this data according to its priority, allowing higher-priority data to be broadcast sooner or more frequently, or to be allocated additional bandwidth, as desired. The dashboard system 103 may then submit content to a broadcast station 105 to be transmitted. Content may be submitted in encrypted form, if desired. A broadcast station 105 may be, for example, a TV broadcast station. Communications 106 to the broadcast station may be by any available communication method; for example, according to an exemplary embodiment, fiber, satellite, microwave or a Virtual Private Network (VPN) communication may be used.

In a third step, the dashboard system 103 may specifically communicate with system-specific software and equipment located at the broadcast station 105. This software and equipment may be used to, for example, incorporate some or all of the transmitted data 101 into a broadcast transmission 107, which may then be broadcast by the broadcast station 105 via broadcast transmitters 110.

In a fourth step, one or more receivers 108 (including 102) may receive and decode the broadcast transmission 107. Optionally, according to an exemplary embodiment wherein the broadcast transmission 107 is encrypted by the dashboard system 103, authorized receivers 108 (including 102) may be configured to run decryption software in order to decrypt the broadcast transmission 107. In an exemplary embodiment, decryption may only be permitted for receivers 108 (including 102) that have been targeted by the sender; this may be accomplished by, for example, sharing a decryption key between the sender and the targeted receivers. According to such an embodiment, content may remain encrypted for users not specifically targeted, denying them access unless or until they are targeted for reception. According to an exemplary embodiment, the permissions of any individual receiver to decrypt the data can be enabled and disabled by the sender dynamically as desired. Also, in an exemplary embodiment, such a sender may be an operator of the dashboard system 103 or users 102 who have sent the data 101 to the dashboard system 103. Data may be decoded in the form of, for example, DTV (digital television) video data, voice or other audio data, or other data, as desired.

In a fifth step, one or more users 102 (may include 108) operating a receiver, such as one or more first responders, may send an acknowledgement or other communication to the dashboard system 103 indicating that they have successfully received the broadcast materials, or indicating that they have unsuccessfully received the broadcast materials. Acknowledgements or other communications may be sent by, for example, over a one-to-one communication method 109, or another communication method, as desired. Broadcast materials that were unsuccessfully received may be rebroadcast or retransmitted using another form of communication, as desired. In an exemplary embodiment, retransmission of broadcast materials may be accomplished by, for example, carouselling files multiple times so that missing data may be retrieved on a subsequent pass, or re-transmitting the missing information either as a datacast or over a separate unicast network like LTE, the Internet, or another such network, as desired.

Turning now to exemplary FIG. 2, FIG. 2 may show a schematic diagram for an exemplary embodiment of a system for datacasting and content management. As described above, video or other content which may be generated one or more sources 102 in the field may be sent to a dashboard system 103. According to an exemplary embodiment, such a source 102 may be a public safety or a private surveillance video management system (VMS) 203. Also, in an exemplary embodiment, the source 102 may include air crafts or any flying objects 201 such as a helicopter, a drone/unmanned aircraft system (UAS), or etc. According to an exemplary embodiment, a system or device specific software may be installed in the public safety or a private surveillance devices or their VMS 203, the aircrafts 201. Also, the software may be installed in private mobile devices 202 as a form of a mobile application, and the system or device specific software may enable to send the video or other content from the sources to the dashboard system 103 or may enable to stream live video to the dashboard system 103, via a mobile network 204 such as LTE network, or etc.

Still referring to exemplary FIG. 2, according to an exemplary embodiment, the dashboard system 103 may include an encoder 205, a cloud system for processing 206 and a contents management dashboard 207. In an exemplary embodiment, the encoder 205 may receive the data 101, including video or other content, from the sources 102 (201, 202 and 203) via the mobile networks 204. Such an encoder 205 may be a software implemented on a computer or an equipment including an application specific integrated circuit (ASIC) which may encode not only the video, but also other content to be a format which is eligible for being processed in the dashboard system 103. According to an exemplary embodiment, the cloud system 206 may store the data which is encoded in the video encoder 205. According to an exemplary embodiment, the encoded data may be stored in local storages in the dashboard system 103 as well as the cloud system 206.

According to an exemplary embodiment, the contents management dashboard 207 may include a software or an equipment which may perform a video processing or other data processing, sorting data for priority, targeting receivers, encrypting of the data for the targeted receivers, generating of files and alerts for distributions, converting the data to broadcasting contents, bandwidth allocations, or etc. In an exemplary embodiment, the encoded data may be stored in the cloud system 206 or local storages and processed in the contents management dashboard 207. According to another exemplary embodiment, the cloud system 206 may also include a software or an equipment which may perform video processing or other data processing, sorting data for priority, targeting receivers, encrypting of the data for the targeted receivers, or etc. with instructions of users via on-line networks.

Referring still to FIG. 2, according to an exemplary embodiment, the data which is processed in the dashboard system 103 may be sent to Network Distribution Backbone, for example, the broadcasting station or satellite station 209, via fiber or other means 208. In another exemplary embodiment, a system specific software or an equipment may be implemented in the broadcasting station, and the converting of the data into broadcasting contents, incorporating the contents into broadcasting transmissions, bandwidth allocations, or etc. may be performed in the broadcasting station 209 instead of the dashboard system 103 (205, 206 and 207).

According to an exemplary embodiment, the broadcasting station 209 may send to the targeted receivers the broadcasting contents via a TV broadcasting network or one-to-one network such as mobile or Internet network. Such a targeted receiver may include a building antenna connected to a Linux receiver, stationary car antenna, laptop receiver, mobile smart phone, tablet, or etc. In an exemplary embodiment, the sources which have sent the data to the dashboard system 103 may also be the targeted receiver. Each receiver may include a system or device specific software or an equipment which may enable to receive, decode, or decrypt the broadcast contents. According to an exemplary embodiment, the broadcasting station 209 may send the broadcasting contents via a broadcasting network of ATSC 3.0 standard in which mobile reception, reception robustness and in-building penetration, interoperability or etc. are enhanced so that the broadcasting contents may reach the target receiver for a case that the target receiver is moving fast or located deep inside a building.

Turning now to exemplary FIG. 3, FIG. 3 may show a schematic diagram for an exemplary embodiment of a system for datacasting of contents from aircrafts. As described above, existing helicopter transmission uses microwave transmitters in the helicopter to transmit to the ground, but such a transmitter method is line-of-sight and is difficult to receive and have limited range. According to an exemplary embodiment, being integrated with the dashboard system, an aircraft and/or an unmanned aircraft system (UAS) may be able to use public or private LTE towers, or towers already in place at broadcast television stations. In an exemplary embodiment, the contents from the aircraft can then be datacast by the dashboard system over a large geographic region. Specifically, referring to FIG. 3, according to an exemplary embodiment, the helicopter 301 may transmit data to a receiving tower 302 which may be the LTE tower or the tower of the broadcast TV stations. Also, in an exemplary embodiment, the helicopter 301 may transmit the data to a specific video management system (VMS) via a helicopter downlink 303. As described above, the data which is to be datacast may also be the contents received from other sources such as stationary car antenna 304 or mobile smart phone 305 via a cell tower 306 as well as other contents of security cameras 307 which is gathered and sent from VMS of a public safety operation center.

Referring still to FIG. 3, according to an exemplary embodiment, via an internet network, all data may be sent to a cloud system 308 which is specified to process and manage the data for datacasting. In an exemplary embodiment, the cloud system 308 may include a specific software or an equipment such as ASIC, a switch, and/or servers, and may process alerts and file transfers as well as assign receiver IDs on the receivers who install a specific application in their devices to receive the data. Also, the cloud system 308 may have a specific server system with an embedded software and/or ASIC which can perform encryption of the data, targeting receiver, system managements, or etc. According to an exemplary embodiment, such a cloud system 308 may be controlled by a plurality of dashboards. In an exemplary embodiment, the dashboard may be operated by public agents such as a police, a fire station, or authorized private person. Also, in an exemplary embodiment, the cloud system 308 may be accessed by a PC 309 in the public safety operation center via an internet web page and the public safety operation center may generate alerts or attach files to the data through the web page.

Referring still to FIG. 3, according to an exemplary embodiment, the processed and managed data may then be sent to TV station from the cloud system 308 to be broadcast as datacasting contents. In an exemplary embodiment, TV station may receive and encode the datacasting contents to be incorporated into TV contents as broadcasting contents. According to an exemplary embodiment, the encoding may also be performed by the cloud system 308 before being sent to the TV station. The communications among the cloud system 308, dashboards, VMS, TV station and/or sources which transfer the data may be Virtual Private Network (VPN) or Secure Sockets Layer (SSL) with a fire wall considering a security matter.

Referring still to FIG. 3, according to an exemplary embodiment, via broadcasting towers, the TV station may broadcast the data to the receivers including aircrafts such as helicopters. In an exemplary embodiment, the helicopter which sent the data to the cloud system may receive the broadcast data if the helicopter has a receiver device in which a specific application software or an equipment is implemented to receive the broadcasting from the TV station. Also, in another exemplary embodiment, the receiver device may be unified, for example, as a cell phone in which the mobile application is installed to receive the datacasting via either the broadcasting network or the mobile network. Under such a system and its application, public, private agents, or users may send contents to be broadcast, and may share each other's contents or feedbacks even though the user is on board the aircraft.

Turning now to exemplary FIG. 4, an example coverage map of a system for datacasting and content management may be displayed. In this example, the map is of a US state, and specifically the state of Florida. Such a coverage map may indicate, for example, the coverage area over which data, such as data from a helicopter or other aircraft, may be received or transmitted. The circles displayed on the map may indicate the approximate ranges at which broadcast transmissions 107 may be received from particular broadcast transmitters 110, and may also indicate, at the center of each circle and at its perimeter, the broadcast station 105 that makes use of the broadcast transmitter 110 in question. For example, the circle on the far left of the map may be labeled as "WSRE," which may indicate that the circle indicates the approximate transmission radius of the WSRE public broadcasting station located in Pensacola, Fla. Other circles on the map may be similarly labeled.

Turning now to exemplary FIG. 5, an example coverage map of a system for datacasting and content management may be displayed. In this example, the map is of the continental United States. Data transmission may be provided by one of a variety of methods, including, for example, satellite, broadcast, microwave, fiber, or another method, as desired. In an exemplary embodiment, a satellite may provide a distribution backbone to broadcast stations across the U.S. which can then distribute content to receivers in their markets.

Turning now to exemplary FIG. 6, an exemplary embodiment of the video display portion 600 of a dashboard system 103 configured to combine data 101 from various sources 102 may be provided. For example, according to an exemplary embodiment, a dashboard system video display 600 may be configured to combine and display data from a proprietary video management system 602, such as the video management system belonging to a security management company, including a security management company other than that which built the dashboard system 103; data from a public video management system 604, such as a video management system configured to display the security feeds at a particular location; and data from a mobile device 606, such as the mobile device of a first responder. In an exemplary embodiment, a mobile device of a first responder may be configured to provide data 606 to the dashboard system video display 600 using a dedicated mobile app.

According to an exemplary embodiment, the display of a dashboard system 600 may be configurable by a user. For example, according to an exemplary embodiment, a user may input configuration requests by the use of a plurality of control buttons 608, which may be provided at, for example, the bottom portion of the display of the dashboard system 600. According to an exemplary embodiment, control buttons 608 may be paired with each video feed or collection of video feeds 602, 604, 606 that is shown on the display of the dashboard system 600. Exemplary control buttons 608 may allow a user to input, for example, an instruction to stop a particular video feed, an instruction to refresh a particular video feed, an instruction to (on a video management system) select other video feeds to be displayed on the dashboard system video display 600, an instruction to view information about the video feed, an instruction to capture a portion of the video feed (such as a recording or still image), an instruction to adjust, enable, or disable the volume of the video feed, or perform another action, as desired.

Turning now to exemplary FIG. 7, an exemplary embodiment of an interface of a dashboard system 700, including a video display portion 600, may be displayed. According to an exemplary embodiment, a dashboard system 700 may, in addition to displaying one or more videos on a video display portion 600, display one or more alerts 704, such as active or recently resolved alerts, in an alert display portion 702. Alerts 704 may be, for example, text, audio, or video alerts 704, or another kind of alert 704, as desired, and may be provided to one or more recipients 706. Alert display portion 702 of the dashboard system 700 may allow a user to control the recipients 706 that a specific alert 704 is sent to, may allow a user to provide one or more attachments 708 to be made available to the one or more recipients 706, may show an initial time in which the alert 704 was received 710, may show a time in which the alert notification 704 is set to expire 714, may show an alert 704 number or identifier 716, and may show one or more other user controls 712 that may be available to a user for a particular alert 704. In an exemplary embodiment, the one or more user controls 712 may include a control to edit the alert 704, such as the title or text content of the alert 704 or any other kind of content of the alert 704, as desired.

According to an exemplary embodiment, the dashboard system 700 may also include a control panel 718, which may allow a user to make other additions or alterations to the content of the dashboard system 700. For example, according to an exemplary embodiment, the control panel 718 may enable a user to add a new alert 704 to the alert display portion 702; for example, in one exemplary embodiment, when the user selects a button labeled "New Alert" or another similar control in the control pane, the user may be provided with a dialog box through which they can create a new alert 704. The user may then be able to broadcast the alert 704 to one or more recipients 706 that have been specified by the user, for example through the "New Alert" dialog or through an interface associated with an individual alert 704 in the alert display portion 702.

In an exemplary embodiment, dashboard system 700 may also track the bandwidth currently used by any broadcasting transmitters that may be associated with the dashboard system 700. In an exemplary embodiment, the bandwidth currently used by the system, as well as other information such as the types of data (files, video, audio, etc.) that the bandwidth has been allocated to, may be shown in a bandwidth display 720. For example, according to an exemplary embodiment, the system may have a particular maximum bandwidth (or throughput). The portion of this maximum bandwidth that is being used by each type of data that is currently being broadcast, which may for example include video and other files, may be displayed in a separate display 720. This may allow the user to perceive what types of data are creating the largest load on the bandwidth available to the system. In the event that the bandwidth allocated to a particular type of content, such as video content, dips below a minimum—for example, if the bandwidth allocated to transmitting video content is too low to transmit the video content at a minimum acceptable quality or latency—then this may be displayed in the bandwidth display 720, for example as the needle of a dial moving from a green portion to a yellow or red portion.

The foregoing description and accompanying drawings illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method of data management for datacasting comprising:
receiving data, by an encoder, from at least one of a plurality of sources; encoding the data, by the encoder, to be a format that is eligible to be managed by a dashboard;
storing the data by a memory;
managing the data, by the dashboard, for datacasting;
authorizing, by the dashboard, at least one of a plurality of receivers to receive the data; and
communicating, by at least one of the plurality of receivers, with the dashboard, wherein when managing the data, the dashboard manages an encryption of the data for a targeted receiver and the targeted receiver decrypts the data after receiving the data, wherein when managing the data, the dashboard prioritizes at least one of the data for the datacasting, wherein when managing the data, the dashboard selects at least one of the data for the datacasting, wherein at least one of the plurality of receivers receives the data via a TV broadcasting network, and wherein the dashboard is at least one of each of portable dashboards, online dashboards, offline dashboards and video management systems (VMSs), and the portable dashboards, the online dashboards, the offline dashboards and the VMSs communicate with each other.

2. The method of claim 1, wherein a first mobile application is implemented on the sources to send the data to the dashboard, and a second mobile application is implemented on the receivers to receive the data.

3. The method of claim 1, wherein when managing the data, the dashboard performs at least one of combining the data, adding an additional information to the data and converting the data into a datacasting content, for the datacasting.

4. The method of claim 1, wherein the source, after receiving the data as the receiver, resend the data to the dashboard after adding a feedback into the data by controlling the dashboard.

5. The method of claim 1, wherein the encoder is operated as an online cloud system.

6. The method of claim 1, wherein the memory is an online cloud storage.

7. The method of claim 1, wherein the dashboard generates the data as the source for the datacasting.

8. The method of claim 1, wherein the data includes at least one of a video, an audio, a text, an image, Metadata, a live data stream, a file, an alert, a notification and an emergency alarm.

9. The method of claim 1, wherein the sources include at least one of a video management system (VMS), a public safety officer, a security camera, an aircraft, an airship, an unmanned aircraft system (UAS), a stationary device and a portable device.

10. The method of claim 1, wherein the receivers include at least one of a stationary antenna, a portable antenna and a wired receiver.

11. The method of claim 1, wherein the dashboard prioritizes the at least one of the data for the datacasting by at least one of broadcasting higher-priority data before broadcasting lower-priority data, increasing a repetition frequency of broadcasting the higher-priority data, or allocating additional bandwidth for transmission of the higher-priority data.

12. The method of claim 1, wherein when managing the data, the dashboard combines data from the plurality of sources, the plurality of sources configured to receive the combined data.

13. A system of data management for datacasting comprising:

a plurality of sources that generates a data;

an encoder that receives and encodes the data to be a format that is eligible to be managed by a dashboard;

a memory that stores the data;

a dashboard that manages and sends the data; and a plurality of receivers that receives the data, wherein the sources or the receivers communicates with the dashboard by at least one of an implemented software and an equipment, wherein the dashboard authorizes at least one of a plurality of receivers to receive the data, wherein the dashboard manages an encryption of the data for a targeted receiver and the targeted receiver decrypts the data after receiving the data, wherein the dashboard prioritizes at least one of the data for datacasting, wherein the dashboard selects at least one of the data for the datacasting, wherein at least one of the plurality of receivers receives the data via a TV broadcasting network, and wherein the dashboard is at least one of each of portable dashboards, online dashboards, offline dashboards and video management systems (VMSs), and the portable dashboards, the online dashboards, the offline dashboards and the VMSs communicate with each other.

14. The system of claim 13, wherein the source receives the data as the receiver, and the source shares a specific content with other sources by sending the specific content to the dashboard.

15. The system of claim 13, wherein the dashboard is controlled by at least one of an authorized operator and the source.

16. The system of claim 13, wherein the dashboard is controlled by a user who has a specific login credential.

17. The system of claim 13, wherein the dashboard controls at least one of the plurality of sources and the plurality of receivers.

18. The system of claim 13, wherein a specific source controls the dashboard for a specific data which is generated by the specific source.

19. The system of claim 13, wherein the memory is an online cloud system.

20. The system of claim 13, wherein the dashboard prioritizes the at least one of the data for datacasting by at least one of broadcasting higher-priority data before broadcasting lower-priority data, increasing a repetition frequency of broadcasting the higher-priority data, or allocating additional bandwidth for transmission of the higher-priority data.

21. The system of claim 13, wherein the dashboard combines data from the plurality of sources, the plurality of sources configured to receive the combined data.

* * * * *